US012179305B2

(12) United States Patent
Lee (10) Patent No.: US 12,179,305 B2
(45) Date of Patent: Dec. 31, 2024

(54) AUXILIARY ADJUSTING AND ABUTTING DEVICE FOR A MATERIAL CUTTING MACHINE

(71) Applicant: SENTOU INDUSTRY CO., LTD., Yuanli Township, Miaoli County (TW)

(72) Inventor: Tai-Yu Lee, Taichung (TW)

(*) Notice: Subject to any disclaimer, the term of this patent is extended or adjusted under 35 U.S.C. 154(b) by 252 days.

(21) Appl. No.: 17/930,793

(22) Filed: Sep. 9, 2022

(65) Prior Publication Data

US 2024/0082967 A1  Mar. 14, 2024

(51) Int. Cl.
   *B23Q 3/00* (2006.01)

(52) U.S. Cl.
   CPC .................. *B23Q 3/005* (2013.01)

(58) Field of Classification Search
   CPC .. B23D 59/001; B23D 59/002; B23D 47/045; B23D 47/04; B23Q 3/005; B27B 27/02; B27B 25/10; B43M 7/00; B25H 7/00; G01B 3/205; B27C 1/02; B27C 1/12; B27C 5/04; Y10T 83/7813; Y10T 83/6604; Y10T 83/741
   USPC ............. 83/446, 434; 144/253.1, 137, 135.2, 144/286.1, 286.5, 253.2, 253.6; 33/18.1, 33/27.01, 569, 811, 626, 628, 642
   See application file for complete search history.

(56) References Cited

U.S. PATENT DOCUMENTS

| 6,026,870 | A  | * | 2/2000  | Liu ........................... B27C 5/04 |
|           |    |   |         | 144/253.8 |
| 6,478,060 | B1 | * | 11/2002 | Liao ....................... B23Q 3/007 |
|           |    |   |         | 144/253.8 |
| 9,486,936 | B2 | * | 11/2016 | Owens .................... B27B 27/10 |
| 9,751,182 | B1 | * | 9/2017  | Warne ....................... B24B 3/36 |
| 10,391,591 | B2 | * | 8/2019  | Smith ..................... B23P 13/02 |
| 11,772,297 | B2 | * | 10/2023 | Klein ........................ B27C 5/06 |
|           |    |   |         | 144/253.1 |
| 2008/0257453 | A1 | * | 10/2008 | Lei ........................... B27C 1/02 |
|           |    |   |         | 144/253.1 |
| 2012/0152078 | A1 | * | 6/2012  | Benard .................... B43M 7/00 |
|           |    |   |         | 83/434 |

* cited by examiner

*Primary Examiner* — Ghassem Alie
(74) *Attorney, Agent, or Firm* — Egbert, McDaniel & Swartz, PLLC (57) ABSTRACT

An auxiliary adjusting and abutting apparatus for a machine that cuts a material has a base, a sliding seat, an adjusting assembly, a ruler rod, and a connecting and positioning piece. The sliding seat is slidably fitted on a guiding groove of the base so as to move forwardly and backwardly. The ruler rod is sleeved inside a connecting tube part and a rotary tube of the adjusting assembly. The connecting and positioning piece has a released mode and a locked mode. A locking end of the connecting and positioning piece is locked on the ruler rod in the locked mode. The ruler rod being movable back and forth in the adjusting assembly when in the released mode.

8 Claims, 7 Drawing Sheets

AUXILIARY ADJUSTING AND ABUTTING DEVICE FOR A MATERIAL CUTTING MACHINE

CROSS-REFERENCE TO RELATED U.S. APPLICATIONS

Not applicable.

BACKGROUND OF THE INVENTION

1. Field of the Invention

The present invention relates generally to an auxiliary component for the operation of a material cutting machine, and more particularly to an innovative structural design of an auxiliary adjusting and abutting device for a material cutting machine.

2. Description of Related Art Including Information Disclosed Under 37 CFR 1.97 and 37 CFR 1.98

During operation of a material cutting machine (e.g., a rotary blade bench saw, a wood milling machine etc.), when the user wants to cut out a workpiece of a narrow width from the material (e.g., 3 mm), usually an abutting and positioning piece will be configured on the bench for the material to abut. In this way, an accurate cutting size can be obtained. The prior-art auxiliary adjusting and abutting device for a material cutting machine comprises a fixing seat positioned on the material cutting machine and a movable adjusting seat. The two sides of the adjusting seat is assembled with a transparent plate with a zero position marks. The two sides of the fixing seat is correspondingly configured with scale marks for feeding of the material. During operation, the abutting end of the adjusting seat is abutted on the side of the saw blade, and the transparent plate is moved to align its zero position line to one scale mark line for material feeding on the fixing seat. Then, the transparent plate is locked to complete the resetting operation. Then, adjust the adjusting seat to a preset workpiece cutting dimension, and lock up the adjusting seat. In this way, when the cutting side of the material to be cut is abutted to the abutting end of the adjusting seat, an accurately cut workpiece can be obtained.

However, in actual applications, it is found that the above-mentioned prior-art structure still has some problems and shortcomings. For example, because the cutting environment is full of fine powders, when the transparent plate of the prior-art structure with the zero position mark covers the scale marks configured on the fixing seat to display the cutting size, the transparent plate may have deposit of dust or scratches, causing blur and difficult recognition. Furthermore, the zero position mark of the transparent plate is usually aligned to the middle section of the scale marks configured on the fixing seat for resetting. However, when the cutting size is adjusted, the user must clearly remember the correct marking line aligned to during the resetting, otherwise the value of the adjusted distance will be mistaken. Therefore, the prior-art structure does not provide good size recognition.

In addition, in the material processing field, the dimension marks are mostly based on the decimal form of metric or English measurement systems (e.g., in the case of metric unit mm, a longer marking line with an integer number mark is provided for every length of 10 mm to facilitate recognition). Therefore, during application of the prior-art structure, if the workpiece to be obtained has a cutting width exceeding one integer mark (e.g., 13 mm), the operator may easily forget or be confused about which range is the current adjusted position is located within, and will have to redo the resetting. Because the user cannot do the operation intuitively, it is quite inconvenient.

BRIEF SUMMARY OF THE INVENTION

The main object of the present invention is to provide an ideal, and more practical new-style auxiliary adjusting and abutting device for a material cutting machine, the material cutting machine being used for cutting a material.

Based on the above object, the main problem-solving technical feature of the present invention is that the auxiliary adjusting and abutting device comprises a base, comprising a front section part and a rear section part, wherein the front section part top face is formed with a guiding groove, the bottom face of the rear section part has a mounting component, the top face of the rear section part is formed with a limiting part, and the base is defined with a material feeding direction and a cutting width adjusting direction based on the state of the cutting operation of the material. The cutting width adjusting direction and the material feeding direction are perpendicular to each other, and the guiding groove is configured along the cutting width adjusting direction.

A sliding seat is fitted on the guiding groove of the base in a manner that it can slide along the cutting width adjusting direction. Said sliding seat comprising a passive end and an abutting end. The abutting end abutting one side of the material, and the abutting end protruding out of the front section part of the base. The passive end is configured with a passive connected part.

An adjusting assembly is configured between the passive end of the sliding seat and the limiting part of the base, the adjusting assembly at least comprising a connecting tube part and a rotary tube in the shape of a hollow through tube, wherein the connecting tube part is assembled on the limiting part of the rear section part of the base, the rotary tube comprises a first end and second end, wherein the first end and the connecting tube part are in threaded connection through a male and female thread joint section, the second end of the rotary tube is assembled on the passive connected part of the sliding seat in a relatively rotary manner, so that, when the rotary tube rotates clockwise or anticlockwise, it will drive the sliding seat to move forward or backward.

A ruler rod is sleeved on the connecting tube part and the rotary tube of the adjusting assembly in the shape of a hollow through tube in a manner that it can only move in a fixed direction. The ruler rod comprises a control rod head and a tail rod section, wherein the control rod head protrudes out of the connecting tube part, the tail rod section is sleeved on the rotary tube and placed on the passive connected part of the sliding seat, and a zero position and size scales are configured from the control rod head to the tail rod section.

A connecting and positioning piece is screwed on the passive connected part of the sliding seat. The connecting and positioning piece comprises an operating part, a screw joint part and a locking end, wherein the passive connected part is configured with a screw hole for threaded connection with the screw joint part, the connecting and positioning piece has a released mode and a locked mode, when in the locked mode, the locking end is locked on the ruler rod, so that the ruler rod and the sliding seat move simultaneously; whereas in the released mode, the ruler rod can relatively move forward or backward inside the adjusting assembly.

The efficacy and advantage of the present invention lies in that: in actual use, as the size scales of the ruler rod are in a protruded form, the starting position of the scales and the adjusted scale value is more readily recognized. With enhanced size recognition, the product becomes more convenient and is therefore more practically advanced.

DETAILED DESCRIPTION OF THE INVENTION

Depicted in the FIG. 1 to FIG. 6 is a preferred embodiment of the auxiliary adjusting and abutting device for a material cutting machine according to the present invention. However, such a preferred embodiment is for illustrative purpose only and is not intending to limit the scope of the invention.

Figure 5:
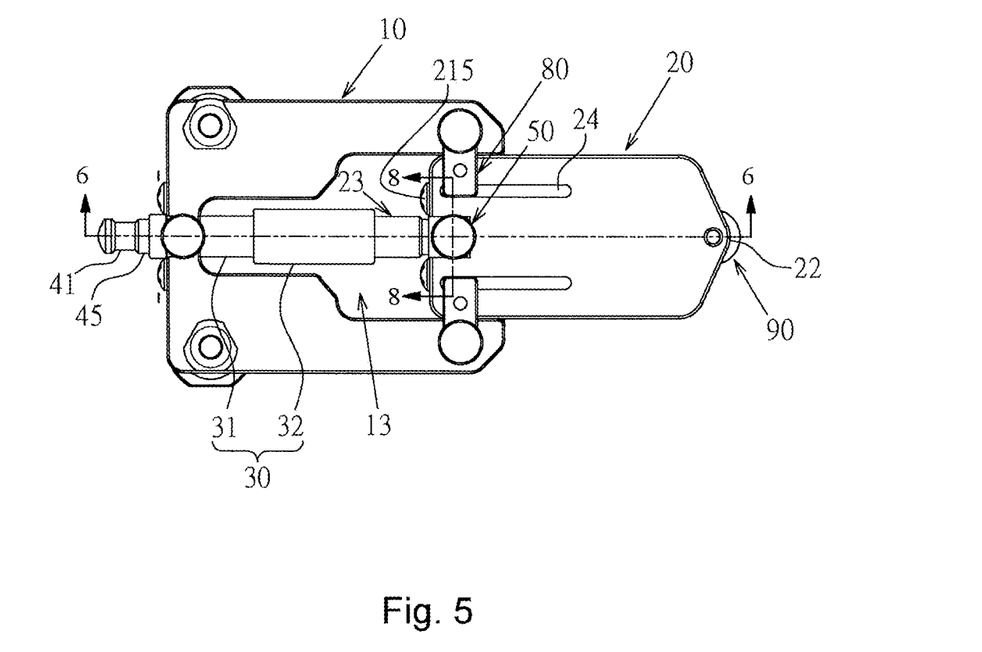
FIG. 5 is a top view of a preferred embodiment of the invention.
Figure 6:
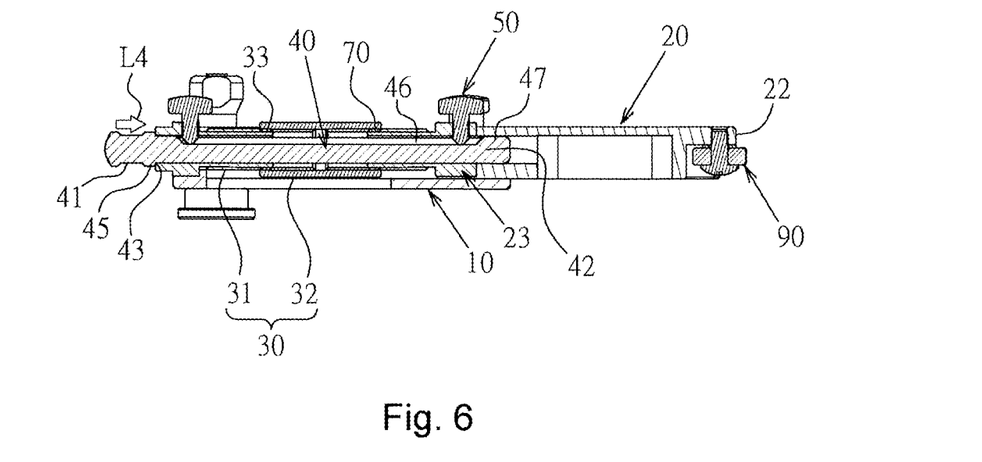
FIG. 6 is a 6-6 sectional view of FIG. 5.
Figure 7:
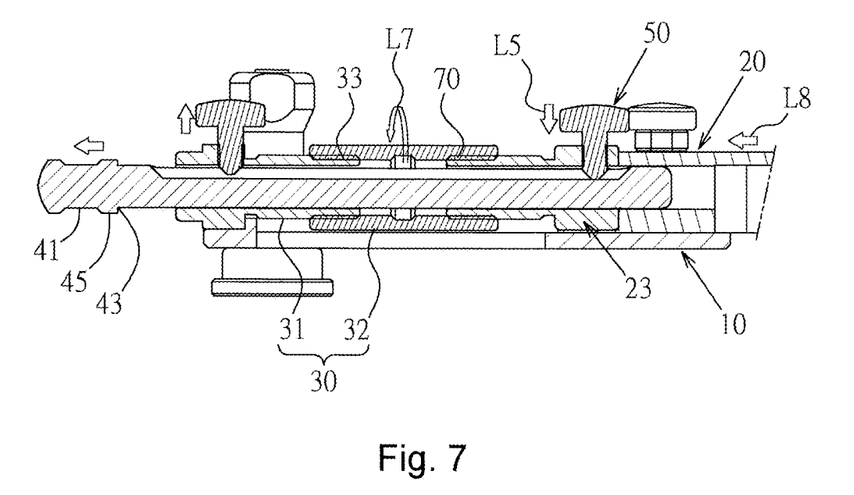
FIG. 7 is a schematic view of the present invention when the connecting and positioning piece is in the released mode.
Figure 8:
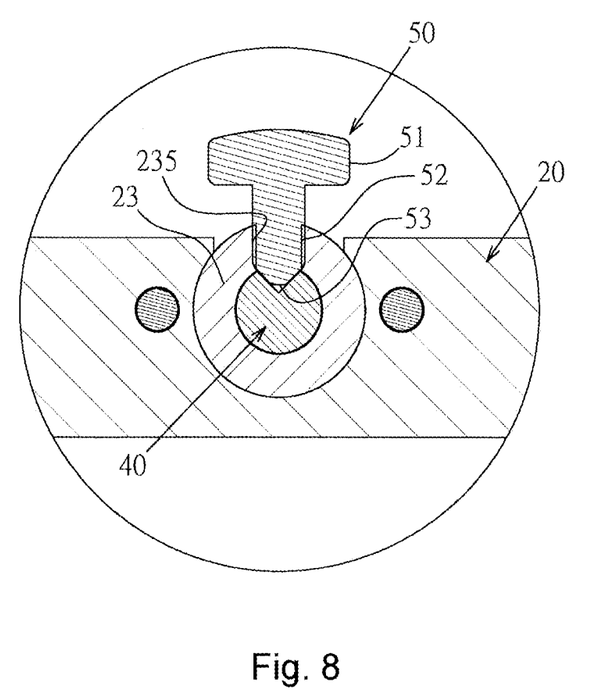
FIG. 8 is a 8-8 sectional view of FIG. 5.

The material cutting machine 05 (e.g., a rotary blade bench saw, wood milling machine) is used for the cutting operation of a material 06. The auxiliary adjusting and abutting device 100 comprises a base 10, comprising a front section part 11 and a rear section part 12, wherein the top face of the front section part 11 is formed with a guiding groove 13, and the bottom face of the rear section part 12 has a mounting component 14. The top face of the rear section part 12 is formed with a limiting part 15 (can be, but not limited to, a through-hole type), and the base 10 is defined with a material feeding direction L1 and a cutting width adjusting direction L2 based on the status of the cutting operation of the material 06. The cutting width adjusting direction L2 and the material feeding direction L1 are perpendicular to each other, and the guiding groove 13 is configured along the cutting width adjusting direction L2. A sliding seat 20 is configured inside the guiding groove 13 of the base 10 in a manner that it can slide along the cutting width adjusting direction L2. The sliding seat 20 comprises a passive end 21 and an abutting end 22. The abutting end 22 is used to abut against one side of the material 06, and the abutting end 22 protrudes out of the front section part 11 of the base 10. The passive end 21 is configured with a passive connected part 23. An adjusting assembly 30 is configured between the passive end 21 of the sliding seat 20 and the limiting part 15 of the base 10. The adjusting assembly 30 at least comprises a connecting tube part 31 and a rotary tube 32 in the shape of a hollow through tube. The connecting tube part 31 is assembled on the limiting part 15 of the rear section part 12 of the base 10. The rotary tube 32 comprises a first end 321 and second end 322, wherein the first end 321 and the connecting tube part 31 are in threaded connection through a male and female thread joint section 33. The second end 322 of the rotary tube 32 is assembled on the passive connected part 23 of the sliding seat 20 in a relatively rotatable manner, so that, when the rotary tube 32 rotates clockwise or anticlockwise, the sliding seat 20 will be driven to move forward or backward. A ruler rod 40 is configured inside the connecting tube part 31 and the rotary tube 32 in the shape of a hollow through tube of the adjusting assembly 30 in a coupling relationship that allows movement in a fixed direction. The ruler rod 40 comprises a control rod head 41 and a tail rod section 42, wherein the control rod head 41 protrudes out of the connecting tube part 31, the tail rod section 42 is sleeved on the rotary tube 32 and placed on the passive connected part 23 of the sliding seat 20, and a zero position 43 and size scales 44 are configured from the control rod head 41 to the tail rod section 42. A connecting and positioning piece 50 is screwed on the passive connected part 23 of the sliding seat 20. The connecting and positioning piece 50 comprises an operating part 51, a screw joint part 52, and a locking end 53 (see FIG. 8). The passive connected part 23 is configured with a screw hole 235 for threaded connection with the screw joint part 52. The connecting and positioning piece 50 has a released mode and a locked mode. When in the locked mode, as shown in FIGS. 5 to 6, the locking end 53 is locked on the ruler rod 40, so that the ruler rod 40 and the sliding seat 20 can move simultaneously; whereas in the released mode, as shown in FIG. 7, the ruler rod 40 can move relatively forward or backward inside the adjusting assembly 30.

Figure 1:
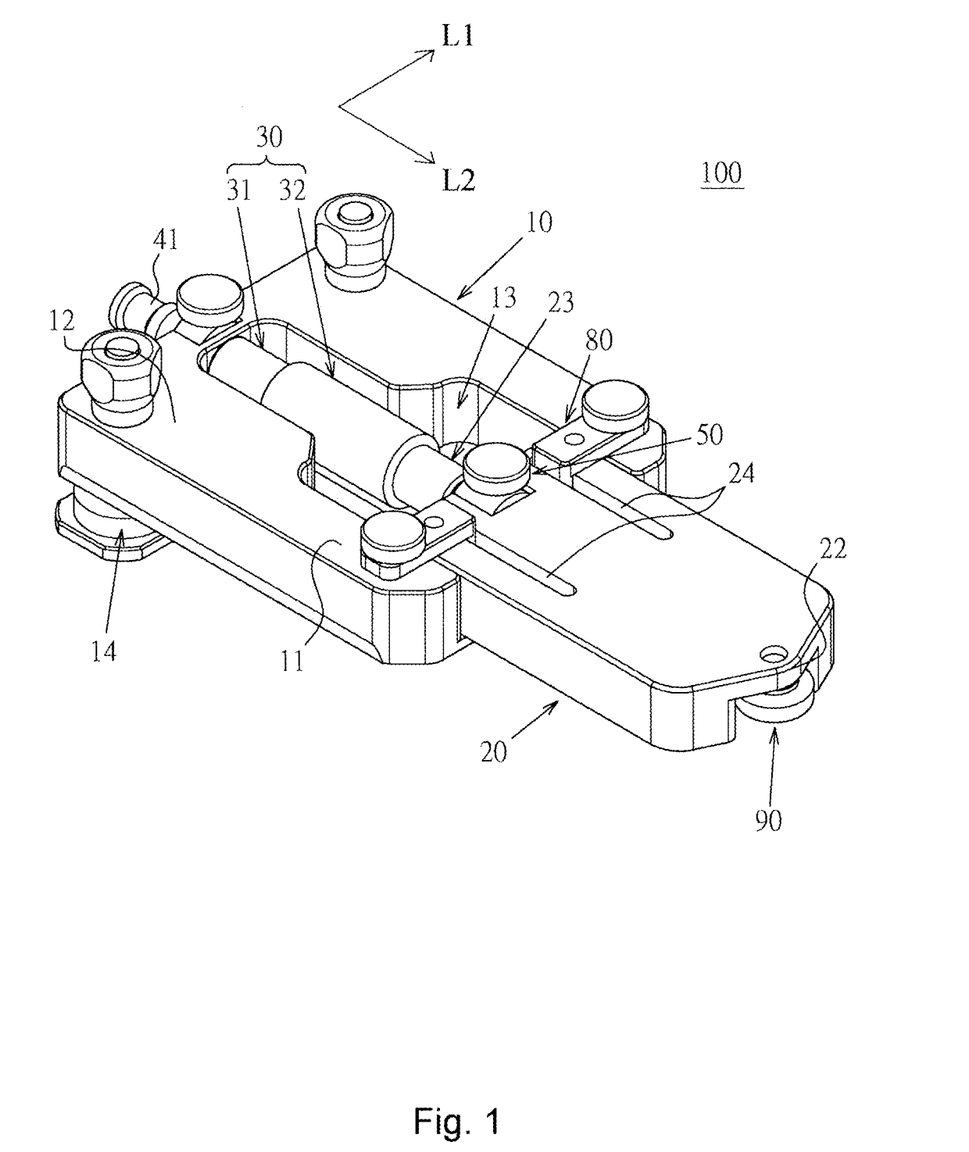
FIG. 1 is a combined perspective view of a preferred embodiment of the invention.
Figure 2:
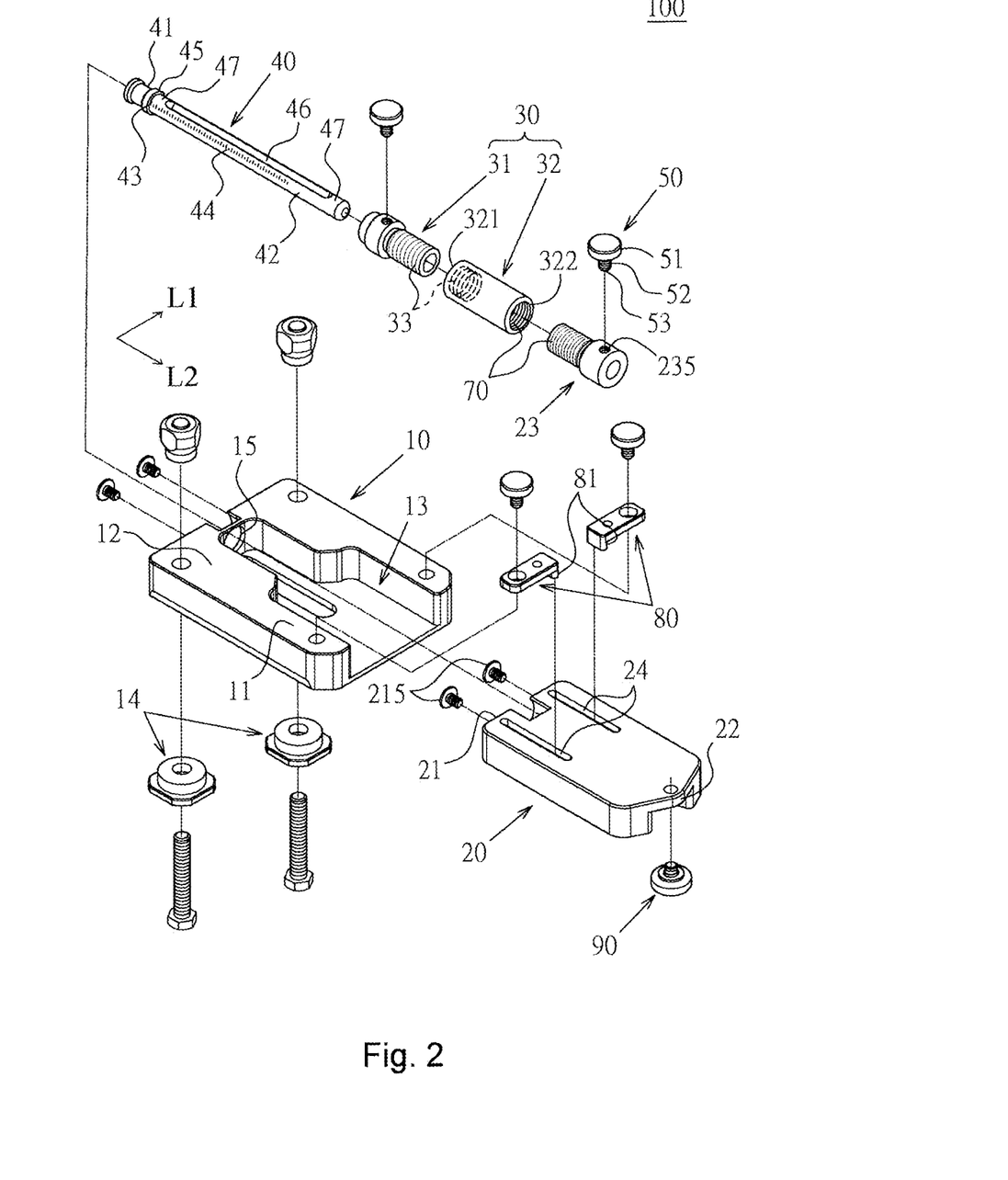
FIG. 2 is an exploded perspective view of a preferred embodiment of the invention.

As shown in FIG. 2, in the present embodiment, the control rod head 41 of the ruler rod 40 is further formed with a ring flange 45, so that the location of the ring flange 45 is equivalent to the zero position. The advantage of the design disclosed in the present invention is that the resetting can be realized when the ring flange 45 abuts the end portion of the connecting tube part 31. It can be understood that, when without the configuration of a ring flange 45, the zero position can also be pure scale marks or other marks.

Referring to FIG. 2, in the present embodiment, one side of the ruler rod 40 is formed with an axial bolt slot 46. The terminal ends of the axial bolt slot 46 do not go through the control rod head 41 and the tail rod section 42 and is formed with two spaced convex walls 47. The locking end 53 of the connecting and positioning piece 50 firstly sticks into the axial bolt slot 46 and is then locked on the ruler rod 40, so that the ruler rod 40 and the adjusting assembly 30 are in a coupling relationship that they can only move in a fixed direction. Disclosed in this example is a preferred embodiment in which the ruler rod 40 and the adjusting assembly 30 are in a coupling relationship that they can only move in a fixed direction and their positions are limited to avoid falling off.

In addition, the ruler rod 40 and the adjusting assembly 30 are in a polygonal coupling relationship, so that the locking end 53 of the connecting and the positioning piece 50 is locked on one side of the polygon of the ruler rod 40, so that the ruler rod and the adjusting assembly are in a coupling relationship that they can only move in a fixed direction. (Note: the present embodiment is omitted in the figure. The advantage of the assembly design of the present embodiment is that, based on the matching sections of the locking end 53 and the ruler rod 40, the locking between them can be more effective.)

Referring to FIG. 2, in the present embodiment, the passive connected part 23 of the sliding seat 20 is in the shape of a hollow tube, and the passive connected part 23 and the second end 322 of the rotary tube 32 are in threaded connection through a second male and female thread joint section 70, so that, when the rotary tube 32 rotates, it will move axially forward or backward in relation to the passive connected part 23. In the design disclosed in the present embodiment, the rotary tube 32 can rotate, and both ends are threaded form guided movement, thus enhancing the rotary movement. Furthermore, the passive connected part 23 is formed with a shoulder part 237 and is aligned to the passive end 21 of the sliding seat 20. The passive end 21 is locked with a plurality of positioning bolts 215. Each positioning bolt 215 has a bolt head 217 to abut against the shoulder part 237 (see FIG. 4), so as to fix the passive connected part 23.

Referring to FIG. 2, in the present embodiment, the top face of the front section part 11 of the base 10 is further configured with two limiting frames in the form of a pair 80 on both sides of the guiding groove 13. Each limiting frames 80 has a pressing claw part 81. The sliding seat 20 is correspondingly formed with two guiding troughs in the form of a pair 24, respectively for the pressing claw part 81 of each of the limiting frames 80 to insert and be coupled. As a preferred embodiment, the present embodiment is designed to limit the movement stroke of the sliding seat 20 and the assembly state.

Figure 3:
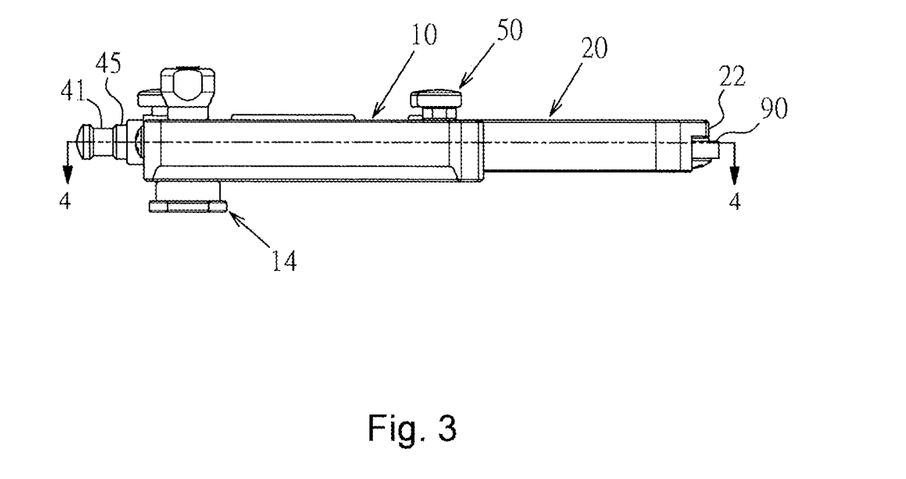
FIG. 3 is a side view of a preferred embodiment of the invention.
Figure 4:
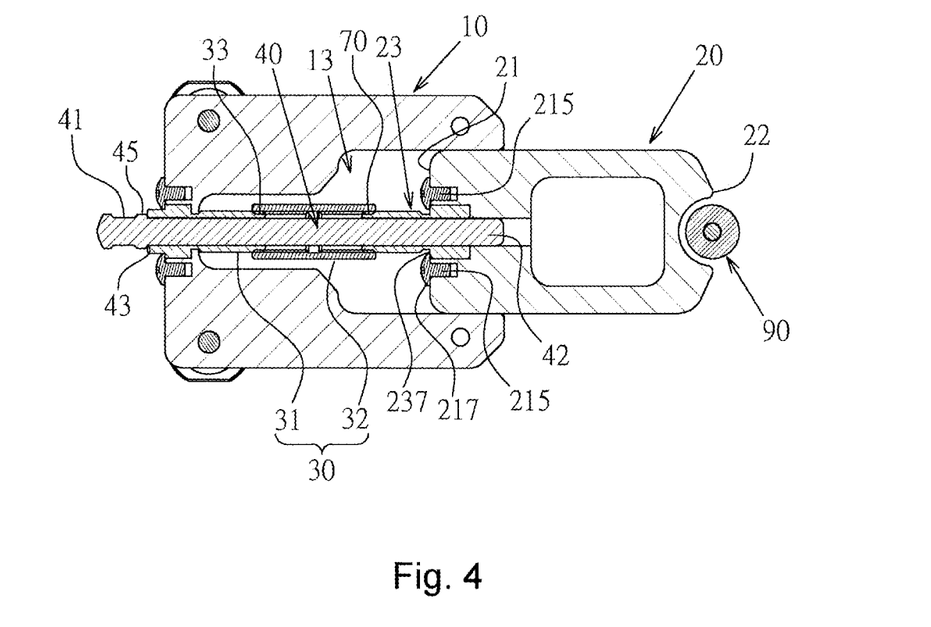
FIG. 4 is a 4-4 sectional view of FIG. 3.

Referring to FIG. 2 to FIG. 4, in the present embodiment, the abutting end 22 of the sliding seat 20 is further configured with a rotary rolling piece 90 (can be, but not limited to, a metal wheel).

Figure 9:
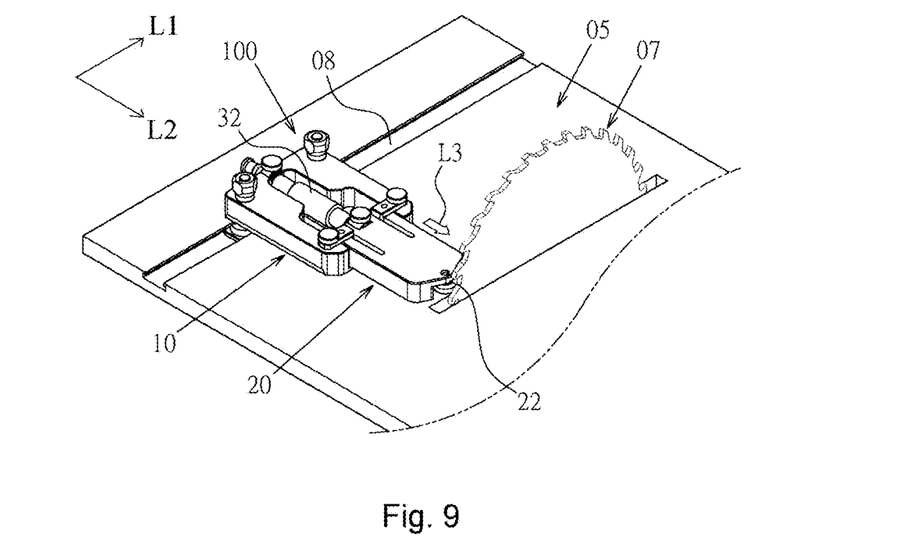
FIG. 9 is an operational view 1 of a preferred embodiment of the invention.
Figure 10:
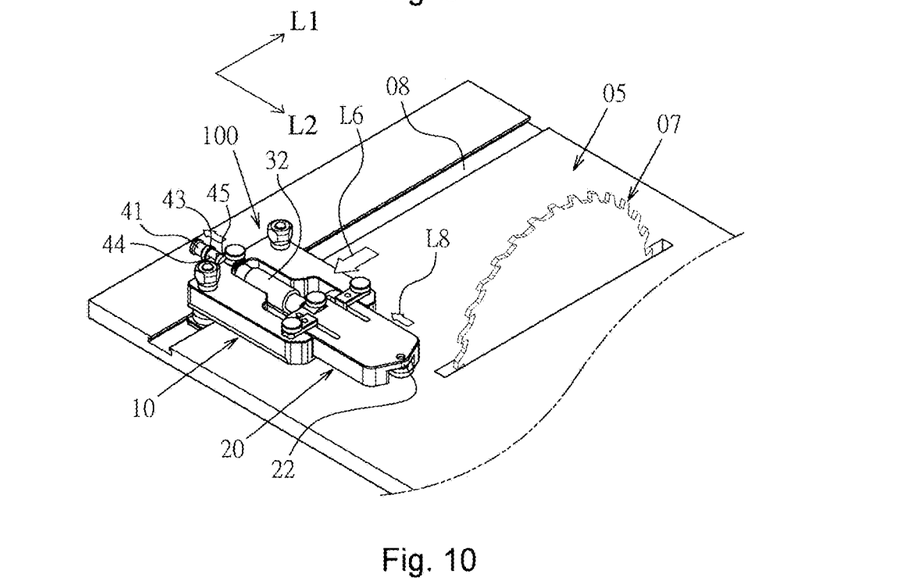
FIG. 10 is an operational view 2 of a preferred embodiment of the invention.
Figure 11:
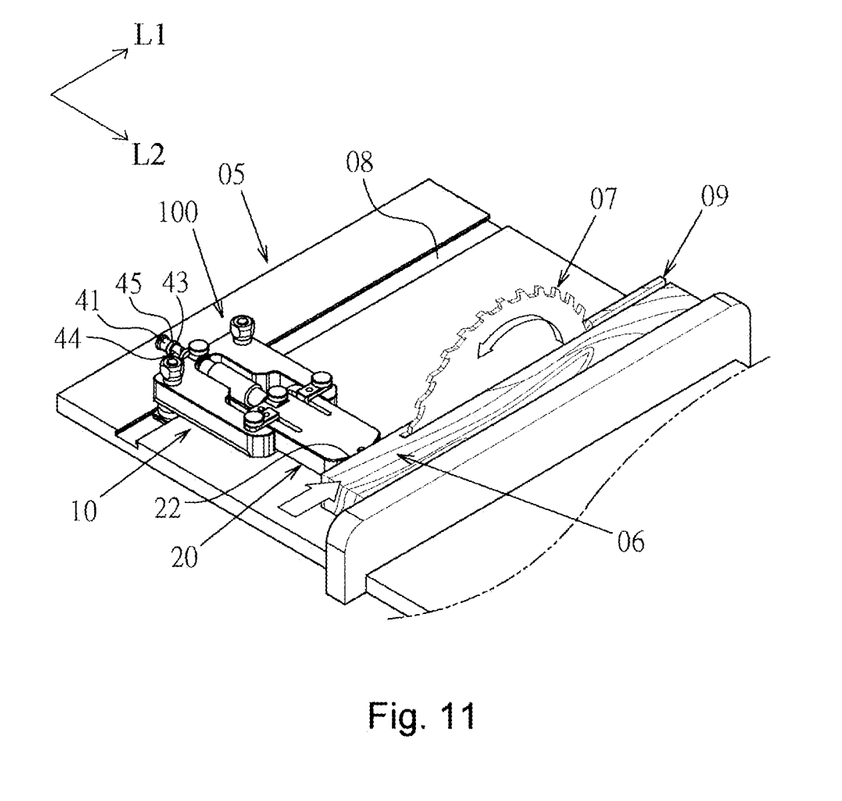
FIG. 11 is an operational view 3 of a preferred embodiment of the invention.

Based on the above structural designs and technical features, the actual operation of the auxiliary adjusting and abutting device 100 disclosed in the present invention is as illustrated in FIG. 9. Through the mounting component 14 on the bottom face of the rear section part 12 of the base 10, the device can be mounted at the position of a preset mounting trough 08 with a distance to the cutting part 07 (e.g., the rotary blade or the milling cutter) of an existing material cutting machine 05 (e.g., a rotary blade bench saw, a wood milling machine etc.), so that the whole auxiliary adjusting and abutting device 100 can move along the material feeding direction L1 to adjust the cutting width. During operation of the present invention, firstly the rotary tube 32 of the adjusting assembly 30 needs to be rotated to drive the abutting end 22 of the sliding seat 20 to move along the cutting width adjusting direction L2 (as indicated by Arrow L3 in FIG. 9), till the abutting end 22 abuts the cutting part 07. Then, conduct the resetting of the ruler rod 40. As shown in FIG. 6, the user applies a force to push the ruler rod 40 (in the direction indicated by Arrow L4) so that its ring flange 45 abuts the end portion of the connecting tube part 31, thus completing the resetting action. Then, as shown in FIG. 7, the connecting and positioning piece 50 is set to the locked mode (in the direction indicated by Arrow L5), so that the passive connected part 23, the ruler rod 40 and the sliding seat 20 move simultaneously. Then, as shown in FIG. 10, the whole auxiliary adjusting and abutting device 100 is pushed along the material feeding direction L1 (in the direction indicated by Arrow L6), and adjusted to the front side of the cutting part 07 in a crossing form. Now, the user adjusts the cutting width by turning the rotary tube 32 (as indicated by Arrow L7 in FIG. 7) of the adjusting assembly 30 to drive the abutting end 22 of the sliding seat 20 to move away from the cutting part 07 (as indicated by Arrow L8 in FIG. 7 and FIG. 10). The size scales 44 of the ruler rod 40 will be moved beyond the end portion of the connecting tube part 31, as shown in FIG. 10. If, for example, the value of the size scales 44 reads 5 mm, it means the cutting width value of the abutting end 22 of the sliding seat 20 is 5 mm. In the end, as shown in FIG. 11, the abutting end 22 is used to abut against one side of the material 06, then the material 06 is moved along the material feeding direction L1. In this way, after cutting of the material 06 by the cutting part 07, a cut finished product 09 with the width value of 5 mm can be obtained. The cutting width is very accurate.

It is to be noted that, because the assembly between the ruler rod 40 and the adjusting assembly 30 can be easily dismantled, manufacturers can easily use different ruler rods to change the metric/English dimension system mode of the scale marks, adding more flexibility to the product structure.

I claim:

1. An auxiliary adjusting and abutting apparatus for a machine that cuts a material, the auxiliary adjusting and abutting apparatus comprising:
   a base having a front section part and a rear section part, a top face of the front section part having a guiding groove, a bottom face of the rear section part having a mounting component, the top face of the rear section part having a limiting part, said base having a material feeding direction and a cutting width adjusting direction relative to a cutting operation of the material such that the material feeding direction is perpendicular to the cutting width adjusting direction, the guiding groove being aligned with the cutting width adjusting direction;
   a sliding seat fitted on the guiding groove of said base so as to slide along the cutting width adjusting direction, said sliding seat having a passive end and an abutting end, the abutting end adapted to abut one side of the material, the abutting end protruding out of the front section part of said base, the passive end having a passive connected part;
   an adjusting assembly positioned between the passive end of said sliding seat and the limiting part of said base, the adjusting assembly having a connecting tube part and a rotary tube, the connecting tube part being assembled on the limiting part of the rear section part of said base, the rotary tube having a first end and a second end, the first end and the connecting tube part being in threaded connection through a first male thread joint section and a first female threaded joint section, the second end of the rotary tube being assembled on the passive connected part of said sliding seat in a rotary manner so as to drive the sliding seat forward or backward when the rotary tube rotates clockwise or counterclockwise;
   a ruler rod sleeved on the connecting tube part and the rotary tube of said adjusting assembly so as to only move in a fixed direction, said ruler rod having a control rod head and a tail rod section, the control rod head protruding out of the connecting tube part, the tail rod section being sleeved on the rotary tube and placed on the passive connected part of said sliding seat, wherein zero position and size scales are formed between the control rod head and the tail rod section; and
   a connecting and positioning piece screwed on the passive connected part of said sliding seat, said connecting and positioning piece having an operating part and a screw joint part and a locking end, wherein the passive connected part has a screw hole for threaded connection with the screw joint part, said connecting and positioning piece having a released mode and a locked mode, the locking end being locked on said ruler rod when in the locked mode such that said ruler rod and said sliding seat move simultaneously, said ruler rod being movable forwardly or backwardly inside said adjusting assembly when in the released mode.

2. The auxiliary adjusting and abutting apparatus of claim 1, wherein said control rod head of said ruler rod has ring flange corresponding to the zero position.

3. The auxiliary adjusting and abutting apparatus of claim 1, wherein one side of said ruler rod has an axial bolt slot, the axial bolt slot having terminal ends that do not go through the control rod head and the tail rod section, the terminal ends each being formed with a pair of spaced convex walls, the locking end of said connecting and positioning piece positioned into the axial bolt slot and locked on said ruler rod such that said ruler rod and said adjusting assembly are only movable in a fixed direction.

4. The auxiliary adjusting and abutting apparatus of claim 1, wherein said ruler rod and said adjusting assembly are in a coupling relationship, the locking end of said connecting and positioning piece being locked on one side of said ruler rod such that said ruler rod and said adjusting assembly are only movable in a fixed direction.

5. The auxiliary adjusting and abutting apparatus of claim 1, wherein the passive connected part of said sliding seat has a hollow tube shape, the passive connected part and the second end of the rotary tube being in threaded connection through a second male threaded joint section and a second threaded joint section such that the rotary tube is only axially movable forwardly or backwardly in relation to the passive connected part.

6. The auxiliary adjusting and abutting apparatus of claim 5, wherein the passive connected part has a shoulder part and is aligned with the passive end of said sliding seat, the passive end of said sliding seat being locked with a plurality of positioning bolts, each positioning bolt of the plurality of positioning bolts having a bolt head that abuts and presses on the shoulder part so as to fix the passive connected part.

7. The auxiliary adjusting and abutting apparatus of claim 1, wherein the top face of the front section part has a pair of limiting frames on each side of the guiding groove, each of the pair of limiting frames having a pressing claw part such that the sliding seat has a pair of guiding troughs to which the pressing claw part is inserted and coupled.

8. The auxiliary adjusting and abutting apparatus of claim 1, wherein the abutting end of the sliding seat has a rotary rolling piece.

* * * * *